United States Patent [19]
Wilson

[11] Patent Number: 6,102,488
[45] Date of Patent: Aug. 15, 2000

[54] TORQUE ANGLE LIMITING WHEELNUT

[75] Inventor: Larry J. Wilson, Commerce Township, Mich.

[73] Assignee: Industrial & Automotive Fastners, L.L.C., Royal Oak, Mich.

[21] Appl. No.: 09/031,396

[22] Filed: Feb. 26, 1998

[51] Int. Cl.$^7$ .................................................. B60B 3/16
[52] U.S. Cl. ................... 301/35.62; 301/122.5; 411/427; 411/430; 411/375; 411/533
[58] Field of Search .................... 301/35.62, 63.1, 301/65; 411/427, 428, 429, 430, 432, 375, 533

[56] References Cited

U.S. PATENT DOCUMENTS

| | | |
|---|---|---|
| 2,432,531 | 12/1947 | Lyon . |
| 2,954,304 | 2/1960 | Hykes .................................. 301/35.62 |
| 3,138,407 | 6/1964 | Duggan ........................... 301/35.62 X |
| 3,649,079 | 3/1972 | English ................................ 301/65 X |
| 3,960,047 | 6/1976 | Liffick .............................. 301/35.62 X |
| 4,201,110 | 5/1980 | Hanai et al. ............................ 411/432 |
| 4,382,635 | 5/1983 | Brown et al. . |
| 4,457,560 | 7/1984 | Rowe et al. . |
| 4,842,339 | 6/1989 | Roulinson . |
| 4,969,788 | 11/1990 | Goiny ..................................... 411/428 |
| 5,163,739 | 11/1992 | Stanlake . |
| 5,772,377 | 6/1998 | Bydalek .................................. 411/429 |

*Primary Examiner*—Russell D. Stormer
*Attorney, Agent, or Firm*—Harness, Dickey & Pierce P.L.C.

[57] ABSTRACT

A wheelnut for securing a wheel to a motor vehicle axle. The wheelnut includes a body having a longitudinal axis, the nut body also having an axial threaded aperture and a pair of ends, one end being in the form of a conical external surface and the other end has wrench flats facilitating the application of torque forces through the wrench flats to the nut body. The wheel has a nut seat surface configured to receive the conical external surface in surface-to-surface engagement, so that a clamping force of increasing magnitude will be applied to the wheel at the seat in response to the application of torque force on the wheel nut. A flange on the body that is generally perpendicular to the axis forms a stop surface on the nut body extending radially outwardly of the conical surface engageable with the wheel in a position of the conical surface seated on the seat surface with force adequate to clamp the wheel prior to deformation of the wheelnut seat by the wheelnut in response to advance of the wheelnut against the seat.

11 Claims, 2 Drawing Sheets

TORQUE ANGLE LIMITING WHEELNUT

BACKGROUND AND SUMMARY OF THE INVENTION

This invention relates generally to wheelnuts for mounting wheels on the axles of motor vehicles. More particularly, the wheelnut of this invention is structured to prevent the nut from engaging the wheel with an overload that might cause deformation of the wheel, particularly, in cases where the wheel is made of a metal softer than steel such as aluminum. The majority of wheelnuts include a conical surface which engages the wheel and applies a clamping force to the wheel in response to torque.

The defining characteristic of the majority of wheelnuts is the conical surface. This is the surface through which clamping forces are applied and also the means by which the wheel is centered in the final assembled position. Decades of application and testing has produced a body of engineering knowledge about wheel assembly. Modern wheel assembly methods and controls have been developed as a result of this empirical data.

A certain minimum clamping force is specified for a wheel assembly and a method for determining that this criteria is met at assembly is necessary. In the laboratory this is accomplished with a special fixture and a load sensor that measures this force. In the assembly plant, no practical method of directly measuring this force exists, but torque and torque angle can be measured. An understanding of the relationship between torque and clamp load makes torque and torque angle an appropriate control measurement to ensure proper clamp load. Upper and lower limits are set for torque applied at assembly and torque angle is monitored to detect variance from the normal duration of the torque vs. tension force curve. Extreme variance from the defined norm can indicate a problem in the assembly that could compromise the assembly strength.

Occasionally very high clamp loads are generated (due to any of several variables) that can mean joint failure on an aluminum alloy wheel and no adverse consequence on a steel wheel. The failure is in the inability of the nut seat in the wheel to support this high clamp load, which is a consequence of the lower strength of aluminum. When this occurs, the nut drives through the wheel until clamp load is achieved. The magnitude of nut seat deformation can be judged by the torque angle value, the greater torque angle indicating greater nut seat deformation. Excessive deformation is considered to produce a faulty or unacceptable joint.

This invention provides for a feature on the wheelnut that limits the amount of deformation in the wheel seat, likewise limiting the torque angle at assembly.

The limiting feature in this invention is the provision of a stop surface on the wheelnut which is generally perpendicular to the axis of the nut and intersects the conical surface to thereby preclude the application of torque forces on the wheelnut that overload and deform the wheel in the case of wheels made of softer metals, such as aluminum. Several embodiments of the invention are disclosed and all include this limiting stop surface which limits the clamping force that can be applied to the wheel when it is being mounted on the motor vehicle.

Further features, advantages and innovations will be apparent from the following drawings when taken in connection with the specification and claims.

Figure 2:
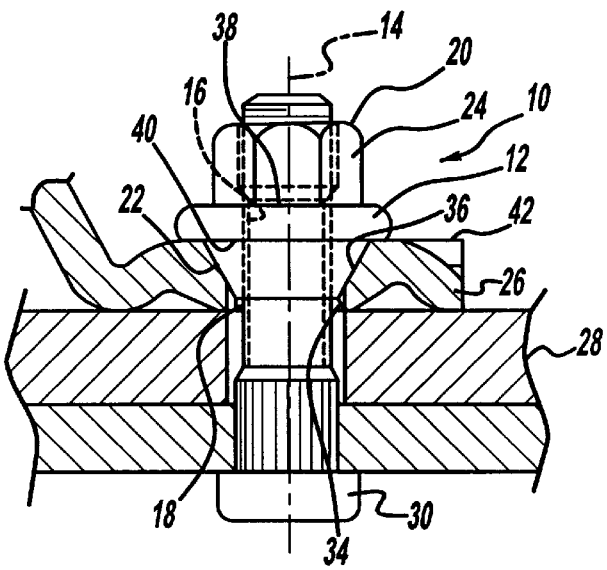
FIG. 2 is a cross sectional view like FIG. 1 showing one embodiment of the improved wheelnut of this invention.

With reference to the drawing, the wheelnut of this invention, indicated generally at 10 in FIG. 2, comprises a metal body 12 having a longitudinal axis 14 and an axial aperture 16. The body 12 has ends 18 and 20 with a conical surface 22 at the inner end 18 and wrench flats 24 at the outer end 20.

The wheelnut 10 is shown in FIG. 2 in a position clamping a motor vehicle wheel 26, only a portion of which is shown, against a conventional axle plate 28 secured to the axle in a motor vehicle (not shown). The wheel 26 is provided with a wheelnut seat surface 36 which is of conical shape corresponding to the shape of the conical surface 22.

The wheel 26 is clamped against the plate 28 by a number of wheelnuts 10 on bolts carried by the axle plate 28, one of which is shown at 30 in FIG. 2. The wheel 26 has a number of openings 34, only one of which is shown in FIG. 2, which are telescoped over the bolts 30. Each opening 34 has a conical nut seat 36 which corresponds in shape to the conical surface 22 on the wheelnut 10. The wheelnut 10 is threaded onto the bolt 32 to a position in which the conical surface 22 seats on the seat 36.

Figure 1:
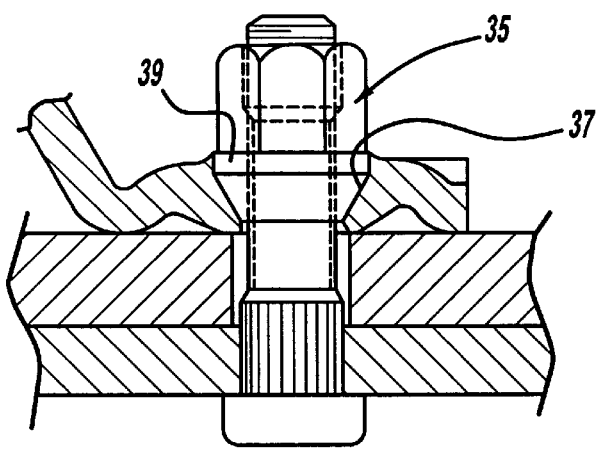
FIG. 1 illustrates a wheelnut that is relatively common in the prior art in assembly relation with a wheel and an axle mounting structure, with many of the elements shown in cross section for purposes of clarity.

A torque force is applied to the wrench flats 24 so as to induce a clamping force on the wheel 26 at the seat surface 36 and by the conical surface 22 on the wheelnut 10. Assuming that the wheel 26 is constructed of a metal that is softer than steel, such as aluminum, it is possible to overload the clamping force on the wheel with a conventional nut 35 shown in FIG. 1 in a normal wheel clamping position.

In the wheelnut 10 of this invention, the body 12 of the wheelnut 10 is provided with a flange 38 which has a stop surface 40 lying generally in a plane 42 which is generally perpendicular to the axis 14. When the surface 40 engages the wheel 26, the torque applied to the wrench flats 24 cannot advance the wheelnut further on the bolt 30. Thus, any chance of a coincident high clamp load excessively deforming the wheel 26 by the wheelnut 10 is positively precluded.

Figure 7:
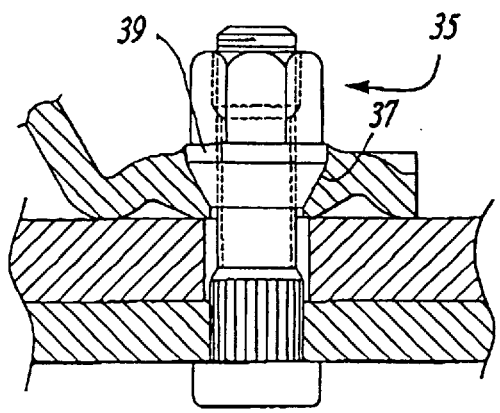
FIG. 7 is a cross sectional view like FIG. 1 showing the prior art wheelnut in a high clamp load position in which it is deforming the wheel.

In contrast, the prior art nut 35 is capable of deforming the wheel 26 by a high clamp force as shown in FIG. 7. The nut 35 has a conical surface 37 but no flange like the flange 38. The cylindrical band 39 above the surface 37 cannot stop the nut 35 from advancing into the surface 37.

The clamping forces applied to the wheel 26 by the wheelnut 10 in response to a torque force on the wrench flats 24, is related to the included angle between the axis 14 and the conical surface 22. The smaller this angle, the greater proportion of the torque forces are transmitted as a compression force on the wheel 26 parallel to the axis 14. Thus, by providing the desirable angle on the conical surface 22 and the position of the flange in the direction of the axis 14, the desired clamping forces can be assured without danger of deformation of the soft metal wheel 26. In order for the stop surface 40 to be effective, it must intercept the conical surface 22. If the plane 42 is spaced from the conical surface, deformation of the wheel could take place prior to the stop surface 40 engages the wheel 26.

Figure 3:
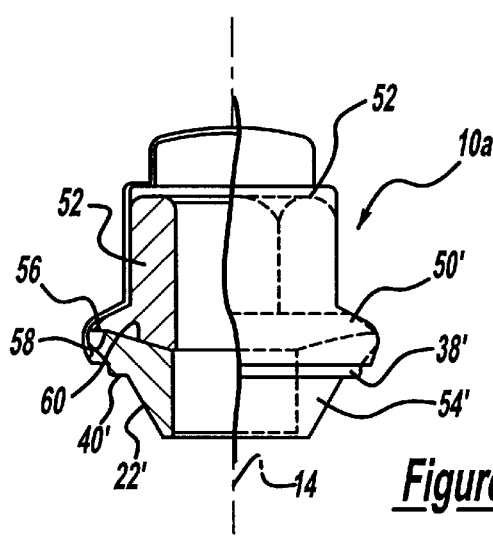
FIG. 3 is a sectional view like FIG. 2 of a wheelnut of this invention, shown in the form of a wheelnut provided with a decorative cap.
Figure 4:
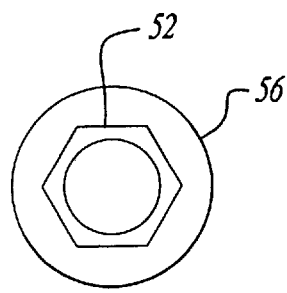
FIG. 4 is a top view of the wheelnut shown in FIG. 3.
Figure 5:
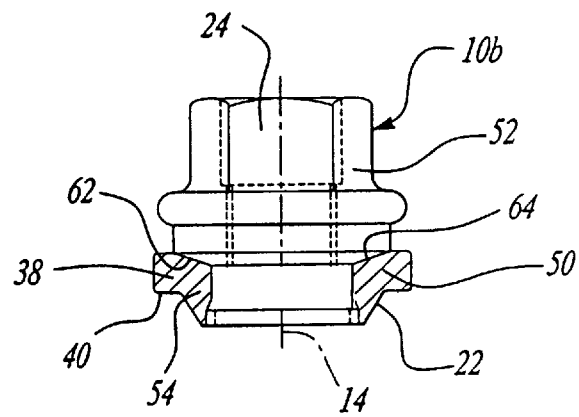
FIG. 5 is a vertical sectional view showing still another embodiment of this invention.
Figure 6:
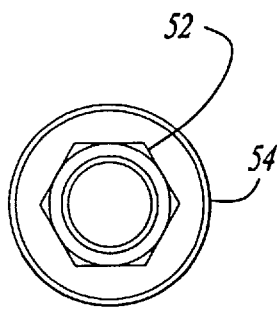
FIG. 6 is a top view of the wheelnut shown in FIG. 5.

FIGS. 3 and 5 show other embodiments of the wheelnut 10. These embodiments are very similar to the embodiment shown in FIG. 2 and for these reasons, like numerals are used to designate like parts in the wheelnuts 10, 10a and 10b. The wheelnuts 10a and 10b differ from the wheelnut 10 described above in that each of the wheelnuts 10a and 10b utilizes a multi-piece body 50' and 50" consisting of an internally threaded member 52' or 52" which can be threaded on the bolt 30 and a washer or "wheel seat engaging" member 54' or 54. The washers 54' and 54" rotate freely around the axis 14. In the wheelnut 10a, an external cap 56 holds the threaded member 52' and the washer 54' together.

Each of the 10a and 10b wheelnuts includes the essential components of the wheelnut 10. For example, each contains the conical surface 22' or 23", the flange 38' or 38' and the stop surface 40' or 40' which is perpendicular to the axis 14 and is in a plane which intersects the conical surface 22' or 22". In the wheelnut 10a, the body 50' has an inclined lower surface 58 which is in surface-to-surface contact with a similar surface 60 on the outer end of the washer 54. A similar arrangement exists in the wheelnut 10b where the body 50" and the washer 54" rotate freely relative to each other. The end faces 62 and 64 on the adjacent ends of the threaded member 52" and the washer 54", respectively, cooperate to transfer the torque forces on the member 52" to the conical surface 22" as clamping forces.

From the above disclosure it is evident that this invention provides wheelnuts 10, 10a and 10b which can effectively be used to attach wheels of soft metal, such as aluminum to motor vehicles without deforming the wheels. These soft metal wheels are in wide use now. This invention will permit further use of the aluminum wheels.

What is claimed is:

1. A wheelnut comprising a body having a longitudinal axis, said body also having an axial threaded aperture and a pair of ends, a conical external surface on one of said ends and wrench flats at the other one of said ends, means forming a stop surface on said body extending radially outwardly of said conical surface, said stop surface being substantially perpendicular to said longitudinal axis and lying generally in a plane which intersects said conical surface thereby enabling engagement with said stop surface to limit movement of said conical surface longitudinally of said axis during use of the wheelnut to secure a wheel to a motor vehicle, wherein said wheelnut is comprised of
   an internally threaded member and
   a washer aligned with said threaded member and in end-to-end relation with said threaded member, said conical surface being located on said washer.

2. A wheelnut for fastening a wheel onto a vehicle with a bolt, the wheel having a surface with an opening for the bolt defined by a conical seat, said wheelnut comprising:
   a body having an axial aperture engageable with the bolt, a conical surface engageable with the conical seat of the wheel, and a stop surface engageable with the surface of the wheel, said stop surface extending radially from said conical surface;
   such that when said wheelnut is rotated onto the bolt, said conical surface of said wheelnut engages the conical seat of the wheel thereby forming an interference fit, and said stop surface of said wheelnut engages the surface of the wheel thereby limiting deformation of the wheel caused by said conical surface of said wheelnut.

3. The wheelnut set forth in claim 2 wherein said stop surface is a flange on said body generally perpendicular to a longitudinal axis of said body.

4. The wheelnut set forth in claim 3 further comprising wrench flats, wherein said wrench flats, said conical surface, and said flange are integral parts of said wheelnut.

5. The wheelnut set forth in claim 2 further including a washer aligned with said body, said conical surface and said stop surface being located on said washer.

6. The wheelnut set forth in claim 5 further including a cap member mounted on said wheelnut so as to maintain the alignment of said body and said washer.

7. A wheel, bolt, and wheelnut combination for a vehicle, comprising:
   a bolt;
   a wheel having a surface with an opening for said bolt defined by a conical seat; and
   a wheelnut having an axial aperture engageable with said bolt, a conical surface engageable with said conical seat of said wheel, and a stop surface engageable with said surface of said wheel, said stop surface extending radially from said conical surface;
   such that when said wheelnut is rotated onto said bolt, said conical surface of said wheelnut engages said conical seat of said wheel thereby forming an interference fit, and said stop surface of said wheelnut engages said surface of said wheel thereby limiting deformation of said wheel caused by said conical surface of said wheelnut.

8. The wheel, bolt, and wheelnut combination set forth in claim 7 wherein said stop surface is a flange on said wheelnut generally perpendicular to a longitudinal axis of said wheelnut.

9. The wheel, bolt, and wheelnut combination set forth in claim 8 further comprising wrench flats, wherein said wrench flats, said conical surface, and said flange are integral parts of said wheelnut.

10. The wheel, bolt, and wheelnut combination set forth in claim 7 further including a washer aligned with said wheelnut, said conical surface and said stop surface being located on said washer.

11. The wheel, bolt, and wheelnut combination set forth in claim 10 further including a cap member mounted on said wheelnut so as to maintain the alignment of said wheelnut and said washer.

* * * * *